J. B. HADAWAY.
COMBINED BELT SHIFTER AND GUARD.
APPLICATION FILED JULY 3, 1916.
1,261,517.
Patented Apr. 2, 1918.
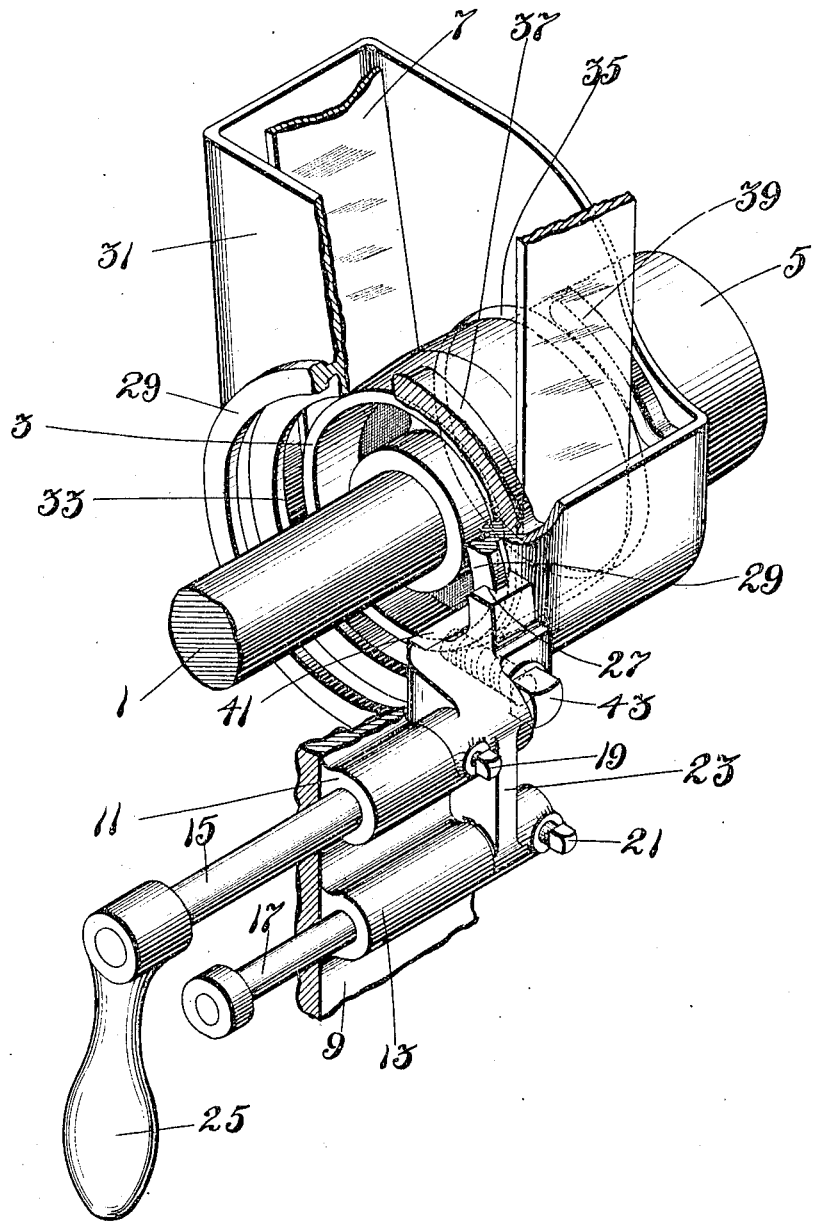
INVENTOR.

UNITED STATES PATENT OFFICE.

JOHN B. HADAWAY, OF SWAMPSCOTT, MASSACHUSETTS, ASSIGNOR, BY MESNE ASSIGN-MENTS, TO UNITED SHOE MACHINERY CORPORATION, OF PATERSON, NEW JERSEY, A CORPORATION OF NEW JERSEY.

COMBINED BELT SHIFTER AND GUARD.

1,261,517.  Specification of Letters Patent.  Patented Apr. 2, 1918.

Application filed July 3, 1916. Serial No. 107,406.

*To all whom it may concern:*

Be it known that I, JOHN B. HADAWAY, a citizen of the United States, residing at Swampscott, in the county of Essex and State of Massachusetts, have invented certain Improvements in Combined Belt Shifters and Guards, of with the following description, in connection with the accompanying drawing, is a specification.

This invention relates to a combined belt shifter and guard.

It is customary in many cases to apply a guard to a belt at the point where it runs about tight and loose pulleys in order to protect the operator from possible injury. Hitherto such a guard has been immovable and has been of a width greater than twice the width of the belt so as to permit the belt to be shifted from one pulley to the other.

One feature of the present invention comprises the combination with a shaft, a plurality of pulleys thereon and a belt adapted to coöperate with a selected pulley, of a combined belt shifter and belt guard having an opening of sufficient size to permit the pulleys to pass through it, and means for moving said combined shifter and guard into operative relation to a selected pulley. By thus combining the belt shifter with the belt guard, the guard can be made of a width only slightly greater than the width of the belt and a very compact and efficient construction is provided.

This and other features of the invention, including certain details of construction and combinations of parts will be described in connection with an illustrative device and pointed out in the appended claims.

Referring to the accompanying drawing, The figure is a perspective of a device in which the present invention is embodied.

A rotary shaft 1, mounted in suitable bearings, not shown, carries tight and loose pulleys 3, 5 with either one of which a belt 7 is adapted to coöperate. On the frame 9 of the machine are formed two bearings 11, 13 in which are slidably mounted two rods 15, 17 the inner ends of which are adjustably fastened by set screws 19, 21 to a carrier block 23. To the outer end of the rod 15 is fastened a handle 25 whereby the block 23 may be moved longitudinally of the shaft 1, the rod 17 being a guide rod the purpose of which is to prevent angular movement of the carrier block 23.

Formed in the block 23 is a segmental guideway 27 in which fits the rim of a circular rib 29, T-shaped in cross-section, formed on the combined belt shifter and belt guard 31. This combined member has a more or less cylindrical lower portion and a more or less rectangular upper portion, being similar in its general shape to guards commonly used, but is of a width only slightly greater than the width of the belt 7; and has formed in the two walls, which extend transversely to the axis of the shaft 1, two circular openings 33, 35 of sufficient size to permit the passage therethrough of the pulleys. Formed on the two walls referred to above are two arms 37, 39 one or the other of which engages a side of the belt 7 when the rod 15 is moved in one direction or the other.

In order to permit the combined belt shifter and guard to be adjusted angularly so as to position it to receive a belt with equal facility irrespective of the angular inclination of the runs of said belt, the rib 29 is adjustably held in the guideway 27 by a suitably shaped clamping jaw 41 and a pinch-bolt 43, said bolt passing loosely through the carrier block 23 and being threaded into the clamping jaw. When, therefore, it is desired to change the angular position of the combined shifter and guard about the axis of the shaft 1, the pinch-bolt 43 is loosened while the adjustment is being made and then tightened when the desired angular position has been reached.

With the construction which has been described above, the necessity for separate belt shifters and guards is obviated, and at the same time a much narrower guard may be used.

Although the invention has been set forth in connection with a particular device, it should be understood that the invention is not limited in the scope of its application to the particular construction which has been shown and described.

Having thus described my invention, I claim as new and desire to secure by Letters Patent of the United States.

1. The combination with a shaft, a plurality of pulleys mounted thereon, and a belt adapted to coöperate with a selected pulley, of a combined belt shifter and guard having an opening of sufficient size to permit the pulleys to pass through it, and means for moving said combined shifter and guard into operative relation to a selected pulley.

2. The combination with a shaft, a plurality of pulleys mounted thereon, and a belt adapted to coöperate with a selected pulley, of a combined belt shifter and guard into which said belt runs, a member manually movable longitudinally of said shaft, means for preventing angular movement of said member, and an adjustable connection between said member and said combined belt shifter and guard whereby said shifter and guard may be adjusted angularly about the axis of said shaft.

3. The combination with a shaft, a plurality of pulleys mounted thereon, and a belt adapted to coöperate with a selected pulley, of a combined belt shifter and guard into which said belt runs, a member manually movable longitudinally of said shaft, and an adjustable connection between said guard and member whereby said guard may be adjusted angularly about the axis of said shaft.

4. The combination with a shaft, a plurality of pulleys mounted thereon, and a belt adapted to coöperate with a selected pulley, of a combined belt shifter and guard into which said belt runs the width of said combined member being less than twice the width of said belt.

5. The combination with a shaft, a plurality of pulleys mounted thereon, and a belt adapted to coöperate with a selected pulley, of a combined belt shifter and guard comprising a manually movable member having a segmental supporting portion, a ring supported thereby and angularly adjustable with respect thereto, a belt engaging member carried by said ring and a belt guard the width of which is less than twice the width of the belt also carried by said ring.

6. The combination with a shaft, a plurality of pulleys mounted thereon and a belt adapted to coöperate with any selected pulley, of a manually movable member having a segmental guiding face, a belt shifter having a portion adapted to be received by said guiding face, a clamping member, and means for drawing said clamping member toward said guiding face to hold said belt shifter in adjusted position.

7. The combination with a shaft, a plurality of pulleys mounted thereon and a belt adapted to coöperate with any selected pulley, of a manually movable member having a segmental guiding face, a belt shifter having a portion adapted to be received by said guiding face, a clamping member, means for drawing said clamping member toward said guiding face to hold said belt shifter in adjusted position, and a belt guard movable with said belt shifter.

In testimony whereof I have signed my name to this specification.

JOHN B. HADAWAY.

Copies of this patent may be obtained for five cents each, by addressing the "Commissioner of Patents, Washington, D. C."